United States Patent [19]

Kable et al.

[11] Patent Number: 4,707,572
[45] Date of Patent: Nov. 17, 1987

[54] TRACER FOR ELECTROGRAPHIC SURFACES

[75] Inventors: Robert G. Kable, Dublin; Philip A. Schlosser, Columbus, both of Ohio

[73] Assignee: Scriptel Corporation, Columbus, Ohio

[21] Appl. No.: 922,090

[22] Filed: Oct. 22, 1986

[51] Int. Cl.⁴ ............................................. G08C 21/00
[52] U.S. Cl. ................................................... 178/18
[58] Field of Search ........................... 178/18, 19, 20; 361/303; 340/709, 710, 365 C

[56] References Cited

U.S. PATENT DOCUMENTS

| | | | |
|---|---|---|---|
| 4,194,084 | 3/1980 | Hetzel | 178/19 |
| 4,600,807 | 7/1986 | Kable | 178/19 |
| 4,639,547 | 1/1987 | Jacob-Grinschgl | 178/18 |

Primary Examiner—Stafford D. Schreyer
Attorney, Agent, or Firm—Mueller and Smith

[57] ABSTRACT

An improved tracer for use with electrographic surfaces which employs reticle components including crosshairs and a sighting circle which additionally functions to provide capacitive coupling. Formed of a conductive material such as chromium, these components are geometric regular shape and somewhat concentrated at the center portion of the reticle targeting center. As such, the device is capable of achieving a close correspondence between actual physical targeting location and resultant digitized coordinate readout. These components further achieve an avoidance of inaccuracies due to active surface border influences. The reticle-capacitive coupling components are placed on one side of a transparent disk, the opposite or upwardly disposed surface of which is coated with a transparent electrically conductive material such as indium tin oxide. This upwardly disposed conductive layer is coupled with ground and there results a dissipation of spurious signals which otherwise may influence the performance of the device.

17 Claims, 6 Drawing Figures

TRACER FOR ELECTROGRAPHIC SURFACES

BACKGROUND OF THE INVENTION

Investigators have developed a variety of technical approaches to the generation of coordinate pair signals from electrographic devices. Industrial requirements for these devices are increasing concomitantly with the evolution of computer graphics, computer-aided design, and computer-aided manufacturing systems. Thus, a considerable degree of accuracy in pinpointing physical conditions upon the surfaces of the electrographic devices or digitizers is required for many applications.

The operation of a digitizer or graphics tablet generally involves the same manual procedures as are employed in conventional graphics design, generally, a locator or cursor or stylus being drawn across or selectively positioned upon the surface of the graphics tablet. In turn, the tablet responds to the position of the cursor to generate analog paired coordinate signals which are digitized and conveyed to a host computer.

A variety of design approaches have been employed for the fabrication of digitizer structures. The more recent and improved approaches to such designs have been to resort to a capacitive coupling of the cursor or locator instrument with the position responsive surface to generate analog paired coordinate signals. Such capacitive coupling can be carried out either with a grid layer which is formed of spaced linear arrays of conductors or through resort to the use of an electrically resistive material layer or coating.

An immediately apparent advantage of developing position responsive surfaces or digitizers having writing surfaces formed of a continuous resistive material resides in the inherent simplicity of merely providing a resistive surface upon a supportive substrate such as glass or plastic. Further, unlike conventionally encountered grid structures, the resistive coatings as well as their supportive substrates may be transparent to considerably broaden the industrial applications for the devices. For example, the digitizers may be placed over graphics or photographic materials for the purpose of tracing various profiles.

A variety of technical problems have been encountered in the development of resistive coating type digitizer devices, one of which concerns the non-uniform nature of the coordinate readouts achieved with the surfaces. Generally, precise one-to-one correspondence or linearity is required between the actual cursor position and the resultant coordinate signals. Because the resistive coatings as well as the glass substrates upon which they are mounted cannot be practically developed without local resistance (thickness) variations, the non-linear aspect of the otherwise promising approach has required a considerable amount of investigation and development. Exemplary of such development is the boarder treatment or switching technique of Turner in U.S. Pat. No. 3,699,439, entitled "Electrical Probe-Position Responsive Apparatus and Method", issued Oct. 17, 1972, and assigned in common herewith. This approach uses a direct current form of input to the resistive surface from a hand-held stylus, the tip of which is physically applied to the resistive surface. Schlosser et al., describes still another improvement wherein an a.c. input signal is utilized in conjunction with the devices and signal treatment of the resulting coordinate pair output signals is considerably improved. See U.S. Pat. No. 4,456,787 entitled "Electrographic System and Method", issued June 26, 1984, also assigned in common herewith. Position responsive performance of the resistive layer devices further has been improved by a voltage waveform zero crossing approach and an arrangement wherein a.c. signals are applied to the resistive layer itself to be detected by stylus or tracer as described in U.S. Pat. No. 4,055,726 by Turner et al. entitled "Electrical Position Resolving by Zero Crossing Relay", issued Oct. 25, 1977, and also assigned in common herewith. Substantially improved accuracies for the resistive surface-type digitizer devices having been achieved through a correction procedure wherein memory retained correction data are employed with the digitizer such that any given pair of coordinate signals are corrected in accordance with data collected with respect to a grid located position on the digitizer resistive surface during the manufacture of the ditizers themselves. With such an arrangement, the speed of correction is made practical and the accuracy of the device is significantly improved. The correction table improvements for these surfaces is described, for example, in application for U.S. patent, Ser. No. 06/742,733, entitled "Electrographic System and Method", filed June 7, 1985, by Nakamura et al. and assigned in common herewith, now U.S. Pat. No. 4,650,926. An improved signal treatment technique for developing more accurate signal response or linearities from resistive surface type digitizers is described in U.S. Pat. No. 4,600,807, by Kable entitled "Electrographic Apparatus" issued July 15, 1986. The latter patent also describes an improved cursor structure having a canted transparent support for a conductive annular ring which is positioned adjacent the electrographic surface to receive signals emanating therefrom for transmission to the noted front-end treatment electronics. The canted design has been found to be very convenient for the user from an ergometric standpoint.

Capacitive coupling using a stylus or cursor has been employed with grid layers which are formed as adjacent but spaced apart arrays of elongate thin conductors. For example, these conductors may be provided as lines of silver ink deposited in orthogonally disposed relationship upon opposite faces of a sheet of insulative material such as Mylar. A resistance network is employed with each of the conductor arrays such that a predetermined resistance is coupled between each conductor from first to last. A technique considerably improving this form of grid array digitizer wherein the grid arrays themselves are excited by an a.c. signal for data collection from a stylus or cursor is described in an application for United States patent by Kable entitled "Position Responsive Apparatus, System and Method having Electrographic Application", Ser. No. 791,324, filed Oct. 25, 1985, and assigned in common herewith.

The stylus and/or cursor structures which are utilized with digitizer tablets must be designed to avoid error associated with their capacitive coupling to the active surface. This is particularly true in the preferred case of digitizer structures wherein the surfaces thereof themselves are excited by an a.c. current. Generally, the hand and body of the user of the cursor or stylus carries part of this a.c. signal which may generate error induced by the passage of signals from the hand and body of the user into the pick-up itself. Further, early cursor structures have been found to exhibit error in position data acquisition due to the irregularities of the digitizer surface over which they are positioned. For example, should the annular ring employed with a cursor be positioned closer to the tablet surface at one diametric extent as opposed to the opposite, then a variation in capacitive coupling is developed. This variation will tend to offset the electrical center of the cursor with respect to the mechanical center which is developed by crosshairs extending through the center of the annulus and visible by the operator. Error also has been occasioned with the use of conventional cursors having an annulus or ring pick-up where the devices are manipulated near to the periphery or borders of the digitizers tablets. Because these borders generally are at ground, the pick-up characteristic of the cursors commences to assume a step-type function output as they are influenced by the change in signal represented by the border condition. Very often, error to the extent of 0.300 inch will be experienced from these border step function effects or through interaction of the cursor device with the body of the user itself.

SUMMARY

The present invention is addressed to an improved tracer for use with position responsive surfaces as are employed with electrographic devices and the like. By combining the functions of visual targeting reticle components with conductive capacitive coupling components, a tracer structure has been achieved which is substantially immune from inconsistencies between physically targeted positions and corresponding digitized readouts corresponding with such positions. The geometric shapes evolved in the resultant combined reticle and capacitive coupling functions achieve a confined region of coupling influence with an associated digitizer or the like surface to an extent where the tracer performs accurately in border regions in addition to performing accurately on surfaces having physical discontinuities otherwise causing error. Further, the tracer of the invention employs an annular disk having a downwardly disposed side which carries the coupling and targeting components and a spaced upwardly disposed surface which is coated with a transparent conductive material such as indium tin oxide which is held at ground by appropriate connection within the system. By so grounding this upwardly disposed surface, the influence of spurious signals or excitation signals occurring within the user's body and hand are dissipated effectively. Thus, the tracer of the invention provides a significantly improved accuracy of readout performance.

A further feature of the invention is to provide an improved operator controlled tracer for use in an electrographic system wherein coordinate data signals are derived by interaction with a position responsive surface. The tracer includes a body portion which is configured for being manually grasped by the operator. An electrically insulative transparent reticle support of predetermined peripheral extent is mounted to and forwardly of the body portion and has a downwardly disposed surface for positioning in adjacency with the position responsive surface. The reticle support further has an upwardly disposed surface through which the position responsive surface may be viewed. The tracer further includes a reticle arrangement including two intersecting electrically conductive crosshair lines of select width for providing a visual position locator and an electrically conductive symmetrically configured geometric shape of predetermined width and of peripheral extent less than the reticle support peripheral extent which is symmetrical about the crosshair line intersection and electrically coupled therewith, the combination providing electrical interaction with the position responsive surface.

Other objects of the invention will, in part, be obvious and will, in part, appear hereinafter. The invention, accordingly, comprises the apparatus possessing the construction, combination of elements, and arrangement of parts which are exemplified in the following detailed disclosure and the scope of the invention is indicated in the appended claims.

For a fuller understanding of the nature and objects of the invention, reference should be had to the following detailed description taken in connection with the accompanying drawings.

DETAILED DESCRIPTION

Figure 1:
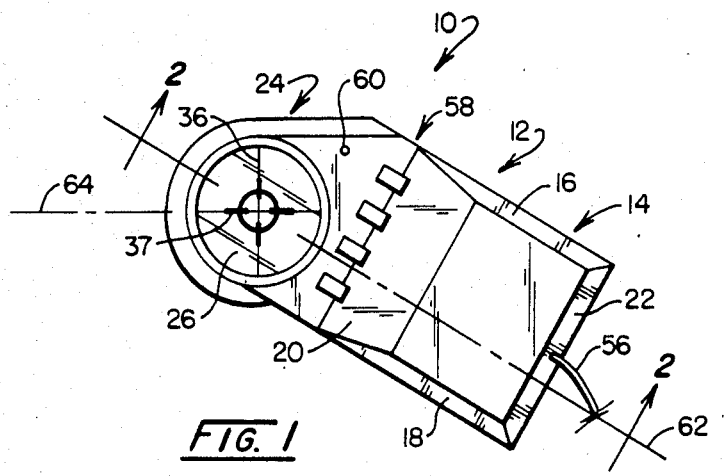
FIG. 1 is a top view of a tracer according to the invention.
Figure 2:
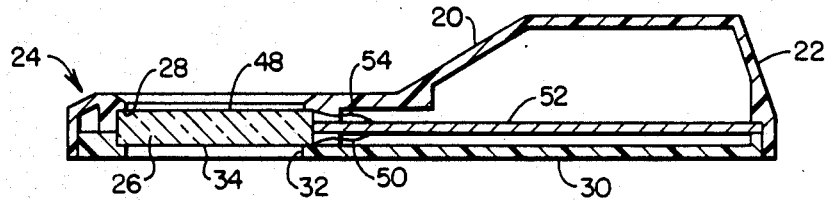
FIG. 2 is a sectional view of the tracer of FIG. 1 taken through the plane 2—2 therein.

Referring to FIG. 1, a hand-held tracer or cursor configured according to the invention is revealed generally at 10. The tracer 10 is formed having a molded body portion represented generally at 12 which is formed of a suitable non-conductive plastic such as an acrylic. The rearward component or portion 14 of the body 12 is formed having two oppositely disposed upstanding sides 16 and 18 which are configured to be manually grasped between the thumb and forefinger of the operator or user of the device 10. The forward and rearward sides as are shown, respectively, at 20 and 22 also are canted such that the rear portion 14 nests within the palm of the operator's hand. Extending integrally from rearward portion 14 is a forward body portion represented generally at 24. As seen in FIG. 2, this portion 24 is of generally thinner dimension and functions to retain an electrically insulative transparent reticle support 26 which may be formed, for example, as a disk of glass having a thickness of about 0.6 cm and a diameter of about 3.25 cm. Disk 26 nests against an appropriate annular ledge 28 in forward portion 24 of the device and is held in place by a plastic base 30 which is seen in FIG. 2 to have a corresponding circular opening 32 which permits visual access through the disk 26 to the digitizer surface or papers or the like positioned thereacross. Preferably, the base 30 is configured such as to be snap-fitted into attachment with body portion 12.

Figure 3:
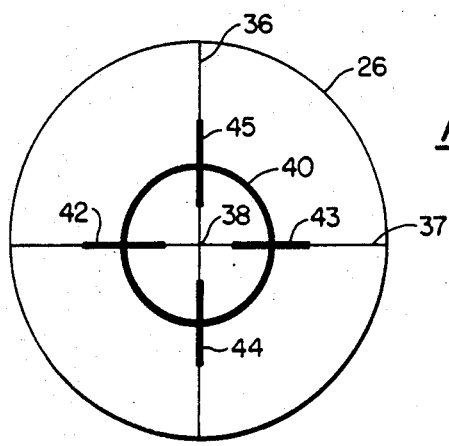
FIG. 3 is an enlarged view of the combined reticle and capacitive coupling components employed with the tracer of FIGS. 1 and 2.

Looking additionally to FIG. 3, the combined capacitive coupling components and reticular sighting or targeting components are revealed in enlarged detail. To achieve an improved readout performance for the cursor or tracer 10, these functions are combined together such that the crosshairs and signting circles function additionally as conductive capacitive coupling elements. Further, the geometry of these sighting and coupling components has been developed so that a region of capacitive coupling influence is achieved which is somewhat concentrated in area extent at the center of disk 26. For example, the disk 26 preferably is configured having a diameter of about 3.25 cm and on its downwardly disposed surface 34 there are deposited two crosshair lines 36 and 37 which are formed of a conductive material such as chromium and are orthogonally disposed to provide a crossover point or center of the disk 26 at 38. A geometric shape of somewhat restricted diameter provided as an annulus or circle 40 is povided which is symmetrically disposed about crosshairs 36 and 37 and is concentrically arranged therewith. Also formed of a conductive material such as chromium, the shape 40 is of relatively smaller diameter extent, for example about 2.5 cm such that its region of influence with an associated digitizer surface is more concentrated. Additionally, it may be observed that the shape 40 has a greater thickness than the outwardly and inwardly disposed portions of the crosshairs 36 and 37. For example, this width may be selected as about 0.175 cm. As is apparent, the shape 40 serves not only as a sighting circle but also to effect capacitive coupling. To further enhance the capacitive coupling while not detracting from the targeting or sighting capabilities of the arrangement, crosshairs 36 and 37 are shown having portions of enlarged width as at 42–45. These portions 42–45 not only enhance capacitive coupling but aid the user in targeting a desired point for digital readout. The arrangement shown has been found to be substantially immune from readout error in the regions of the border of the digitizer surface as well as from variations of capacitive coupling due to surface variations encountered at the digitizer surface and like phenomenon otherwise affecting uniform capacitive coupling.

To avoid the influence of spurious signals which may be encountered from the hand or body of the user and the like, the upwardly disposed surface 48 of the disk 26 is coated with a transparent and electrically conductive layer of indium tin oxide which is connected with the ground of the system. Thus, each of the surfaces 34 and 48 of disk 26 function within the tracer 10 to improve readout performance. FIG. 2 reveals that the electrical association of the conductive components for targeting and capacitive coupling is provided, for example, by a lead 50 extending form connection therewith to a circuit board 52 contained within the rearward body portion 14 of the device. Similarly, the conductive surface or layer at upwardly disposed surface 48 is coupled to the circuit board 52 for appropriate grounding, for example, by lead 54.

Circuit board 52 supports components providing for the noted ground, pick-up function as well as switching functions and the like which may be employed with the tracer. Returning to FIG. 1, communication between board 52 and a control circuitry is provided by a shielded cable 56 extending from rear side 22. This cable further provides lead inputs to an array of finger actuated switches 58. Each of the switches at array 58 may be, for example, provided as an elastomeric, over-center type having a positive tactile feedback when actuated. Each switch completes contact with a corresponding contact pair supported by the circuit board 52. The tracer 10 further carries a light emitting diode 60 which is illuminated at such time as data representing a coordinate pair is received and accepted by the host computer facility with which the device 10 is operationally associated. The switches at array 58 may have any of a variety of designations, for example, representing the development of coordinate data for a series of variously colored printouts.

Of particular importance in the design of the tracer 10 is the inclination of the forward, cross-hair containing portion thereof 24 with respect to the elevated, hand-griping or rearward portion 14. In this regard, the grip or body portion 14 may be considered to have a longitudinal axis represented at line 62. However, the forward portion 24 is canted by an amount of about 30° with respect to axis 62. In this regard, note the axis 64 passing through the horizontally aligned cross hair line 37. With this arrangement, as the tracer 10 is gripped between the thumb and forefinger such that the user's thumb is against side 18, the crosshair line 36 will be aligned vertically and the crosshair 37 will be aligned horizontally before such user in the ergonomically most desirable orientation. For example, should that forward portion 24 be extended in alignment with the axis 62, then the natural inclination of the operator's right hand will be one exhibiting a slight strain. The orientation of forward portion 24 is canted in the opposite direction for left-hand utilization. It further may be observed that the body portion 148, being elevated and formed with inwardly canting sides, nests suppportively and comfortably in the palm of the user's hand to avoid fatigue.

Testing of the tracer 10 embodying the combined targeting and capacitive coupling components represented in FIG. 3 was carried out in conjunction with comparative testing of a tracer having a singular annular ring for capacitive couping and a non-conductive crosshair arrangement. The latter device is described in the above-noted U.S. Pat. No. 4,600,807.

Figure 4:
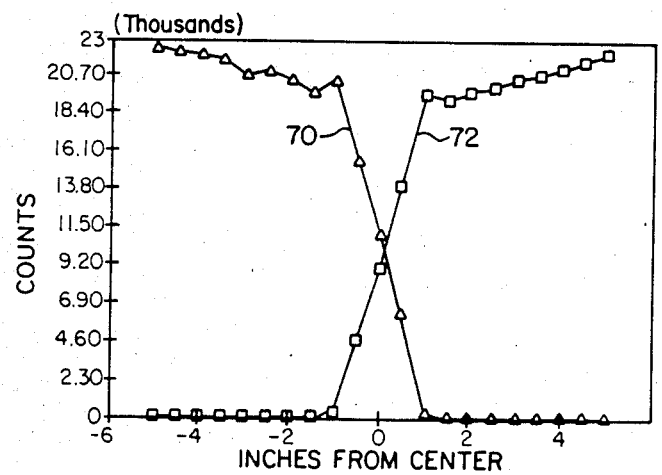
FIG. 4 is a graph showing the results of tests for border effect carried out with an earlier tracer.
Figure 5:
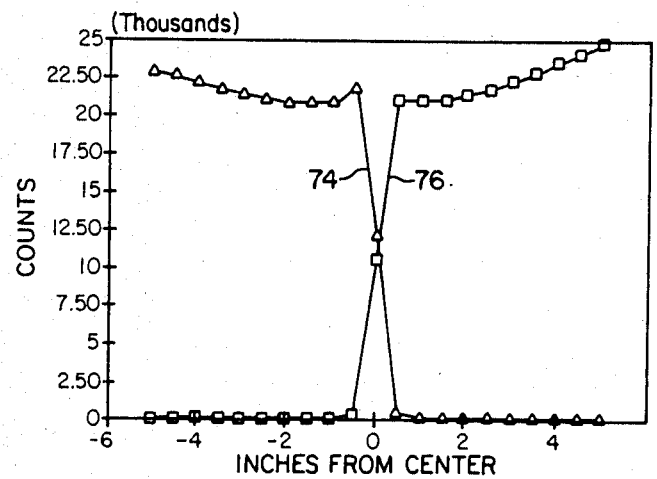
FIG. 5 is a graph describing test procedures corresponding with those carried out in conjunction with FIG. 4. but using the tracer of the instant invention.

Looking to FIGS. 4 and 5, the noted comparison between the former tracer and a tracer configured according to the instant invention is revealed. To develop the curves shown in these figures, a tracer was operated along predetermined horizontal grid lines which were established between two rectangular metallic plates having the linear side of one abutting the corresponding linear side of the other. A Mylar tape insulated the two plate edges from each other. Excitation was applied to one plate while corresponding ground was applied to the other in a manner similar to the XMINUS and XPLUS excitation described in the above-noted U.S. Pat. No. 4,600,807. By moving the tracer horizontally upon the surfaces of the plates toward the abutting union between them, a border effect could be evaluated. In FIG. 4, using the tracer according to earlier design, the resultant readout curves 70 and 72 are seen to be linear at the tops and bottoms but develop a relatively shallow sloping transition as the cursor crosses the border. In this regard, the zero position in each of the figures represents the position of the border or union between the two metallic sheets, while the term "counts" along the ordinate of the chart represents the output of the analog-to-digital converter of the signal pretreatment components of the graphics device described in the U.S. Pat. No. 4,600,807.

By comparing the perfomance of the tracer 10 when identically operated, as shown in FIG. 5 at curves 74 and 76, one may observe a much sharper slope representing a substantial immunity from border effects. In effect, border effects occur only within about a one-half inch region about the noted union between the two metallic plates.

Figure 6:
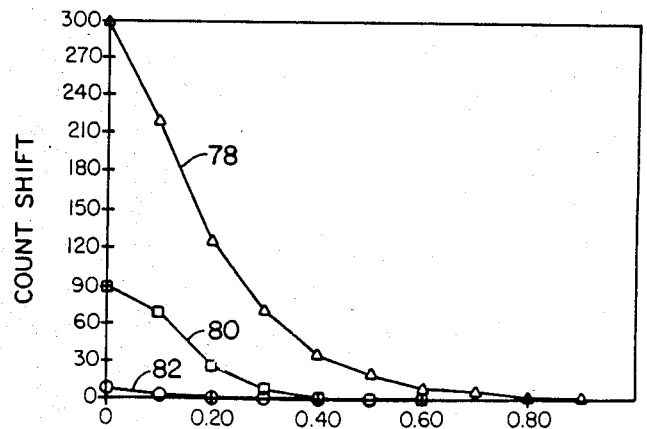
FIG. 6 is a graph showing a series of cures showing the relative immunity of three tracers to external radiation noise.

Referring to FIG. 6, the the evaluation of the relative immunity from environmental radiation disturbance of former tracer devices with that described at 10 is revealed. To carry out this testing, a conventionl digitizer tablet as marketed by Scriptel Corporation, Hilliard, Ohio, Model SPD 2436, was employed. One corner of the tablet of this device was selected as the region to carry out the test. In each case, the tracer was positioned at that same region and the tablet was excited, for example, in a singular horizontal manner with an a.c. source. This excitation would normally develop, for example, an XPLUS reading. To test the relative immunity of the tracer from outside a.c. signal influence, an antenna was deviced formed of wire and was positioned at varying distances from the side of the tracer. These distances are recorded in inches at the bottom of the graph of FIG. 6. The antenna was excited by a signal of the opposite direction, i.e. for the example at hand, with an XMINUS signal. The digitizer device performs to derive a number of "counts" having a value which is readily translated to a distance, for example in inches. The influence of the antenna derived signal in terms of an error deviation represented by these counts is recorded on the graph of FIG. 6 and, for example, a value of 300 wil represent 0.3 inch. An earlier design tracer, as described in the above-noted U.S. Pat. No. 4,600,897 was initially positioned at the noted region and curve 76 was generated showing the influence of external radiation. That same tracer structure then was developed having a grounded metal body which was essentially identical in shape as tracer 10. By providing the tracer with that metallic shielding, an influencing curve as represented at 80 was developed which represents a considerable improvement over the performance of the earlier cursors as represented at curve 76. The tracer 10 was then tested identically and the considerable immunity of the tracer from outside radiation influences is represented by its performance as shown at curve 82.

Since certain changes may be made in the above described apparatus without departing from the scope of the invention herein involved, it is intended that all matter contained in the description hereof as shown in the accompanying drawings shall be interpreted as illustrative and not in a limiting sense.

What is claimed is:

1. In an electrographic system wherein coordinate data signals are derived by interaction with a position responsive surface, the improved operator controlled tracer comprising:
    a body portion configured for being manually grasped by said operator;
    an electrically insulative transparent reticle support of predetermined peripheral extent mounted to and forwardly of said body portion having a downwardly disposed surface for positioning in adjacency with said position responsive surface and an upwardly disposed surface through which said position responsive surface may be viewed; and
    reticle means including two electrically conductive crosshair lines of select width for providing a visual position locator, and an electrically conductive symmetrically configured geometric shape of predetermined width and of peripheral extent less than said reticle support peripheral extent, symmetrical about said line intersection and electrically coupled therewith, said crosshair lines and said shape selectively effecting electrical interaction with said position responsive surface.

2. The improved tracer of claim 1 including:
    a transparent, electrically conductive material positioned upon said reticle support upwardly disposed surface; and
    means for grounding said material to dissipate spurious electrical signals otherwise transmitted to said reticle means from the body of said operator.

3. The improved tracer of claim 2 in which said electrically conductive material is formed as an electrically conductive layer upon said upwardly disposed surface.

4. The improved tracer of claim 3 in which said electrically conductive material is indium-tin-oxide.

5. The improved tracer of claim 4 in which said reticle support is provided having a thickness of about 0.6 centimeter.

6. The improved tracer of claim 1 in which said geometric shape predetermined width is of greater extent than said select width of said crosshair lines.

7. The improved tracer of claim 1 in which said reticle means geometric shape is an annulus having a center symmetrical with respect to said crosshair lines.

8. The improved tracer of claim 7 in which said reticle means crosshair lines select width is substantially equal to said geometric shape predetermined width in the vicinity of their mutual intersection and is less than said predetermined width without said vicinity.

9. The improved tracer of claim 8 including:
    a transparent, electrically conductive material positioned upon said reticle support upwardly disposed surface; and
    means for grounding said material to dissipate spurious electrical signals otherwise transmitted to said reticle means from the body of said operator.

10. The improved tracer of claim 9 in which said electrically conductive material is formed as an electrically conductive layer upon said upwardly disposed surface.

11. The improved tracer of claim 1 in which said body portion comprises:
    a first body portion having two oppositely disposed upstanding sides configured for being manually grasped substantially between the thumb and forefinger of said operator's hand and having an axis extending generally parallel with said sides; and
    a forward body portion extending forwardly of said first body portion, inclined with respect to said axis and supporting said reticle support to align said crosshair lines to be canted with respect to said axis by a predetermined angle selected to normally align said crosshair lines vertically and horizontally before said operator when said tracer is naturally grasped.

12. The improved tracer of claim 11 in which said crosshair line cant is about 30° with respect to said axis.

13. The improved tracer of claim 11 in which said reticle means geometric shape is an annulus having a center symmetrical with respect to said crosshair lines.

14. The improved tracer of claim 13 including:
    a transparent, electrically conductive material positioned upon said reticle support upwardly disposed surface; and
    means for grounding said material to dissipate spurious electrical signals otherwise transmitted to said reticle means from the body of said operator.

15. The improved tracer of claim 14 in which said electrically conductive material is formed as an electrically conductive layer upon said upwardly disposed surface.

16. The improved tracer of claim 15 in which said reticle support is provided having a thickness of about 0.6 cm.

17. The improved tracer of claim 16 in which said first body portion extends upwardly from said forward body portion and said upstanding sides thereof are slanted inwardly and are dimensioned to effect the nesting of said first body portion within the palm of said operator's hand.

* * * * *